United States Patent [19]

Kakiuchi et al.

[11] Patent Number: 5,785,885
[45] Date of Patent: Jul. 28, 1998

[54] HEAT STORAGE MATERIAL COMPOSITION

[75] Inventors: Hiroyuki Kakiuchi; Shoichi Chihara; Masanori Yamazaki; Tsutomu Isaki, all of Inashiki-gun, Japan

[73] Assignee: Mitsubishi Chemical Corporation, Tokyo, Japan

[21] Appl. No.: 678,534

[22] Filed: Jul. 5, 1996

[30] Foreign Application Priority Data

Jul. 12, 1995 [JP] Japan ................................. 7-176253
Jan. 12, 1996 [JP] Japan ................................. 8-003724

[51] Int. Cl.$^6$ ............................................. C09K 5/06
[52] U.S. Cl. ............................................. 252/70
[58] Field of Search ................................. 252/70

[56] References Cited

U.S. PATENT DOCUMENTS 4,572,864  2/1986  Benson et al. ........................... 252/70
4,795,580  1/1989  Hormansdorfer ........................ 252/70

FOREIGN PATENT DOCUMENTS 0 722 997  7/1996  European Pat. Off. .
4 244 465  9/1993  Germany .

OTHER PUBLICATIONS

Database WPI, Week 9311, Derwent Publications Ltd., London, GB; An 93–08887, XP002013701 & JP-A-05032963 (Nikken Kasei KK) *abstract* (Feb. 1993).

Database WPI, Week 8437, Derwent Publications Ltd., London, GB; AN 84–227728, XP002013702 & JP-A-59 134 497 (Agency of Ind Sci Tech) *abstract* (Aug. 1984).

Abstract of Japanese Laid–Open Patent Application (Kokai) No. 32963/1993 (Feb. 1993).

Chemical Abstract No. 121:208104, which is an abstract of German Patent Specification No. 4,302,496 (Aug. 1994).

Chemical Abstract No. 121:182784, which is an abstract of Japanese Patent Specification No. 6–158035 (Jun. 1994).

WPIDS Abstract No. 87–093775, which is an abstract of PCT Publication No. 87/01716 (Mar. 1987).

WPIDS Abstract No. 93–221296, which is an abstract of Japanese Patent Specification No. 5–093186 (Apr. 1993).

*Primary Examiner*—Anthony Green
*Attorney, Agent, or Firm*—Oblon, Spivak, McClelland, Maier & Neustadt, P.C.

[57] ABSTRACT

Provided is a heat storage material composition comprising at least one sugar alcohol selected from erythritol, mannitol and galactitol, and a salt which is sparingly soluble in the sugar alcohol. The heat storage material composition of the present invention can stably be used for a long period of time since the crystallization temperature is not decreased even if heat absorption and heat radiation are repeated.

12 Claims, 1 Drawing Sheet

HEAT STORAGE MATERIAL COMPOSITION

FIELD OF THE INVENTION

The present invention relates to a heat storage material composition which is composed mainly of erythritol, mannitol or galactitol and which utilizes a latent heat of fusion of this compound.

PRIOR ART

Since a latent heat storage material has a heat storage density which is higher than a sensible heat storage material and has a fixed temperature of phase change, it has been put to practical use upon utilizing the stable temperature at which to take out a heat. As a latent heat storage material, ice, sodium sulfate decahydrate, calcium chloride hexahydrate, sodium acetate trihydrate are known. However, the temperature of phase change of these latent heat storage materials is relatively low. Therefore, these materials are inappropriate as heat storage materials which use a solar energy or a waste heat given in hot water supply or in a boiler and which are required to have a relatively high temperature of phase change of from 90° to 190° C.

It was proposed that sugar alcohols such as erythritol, mannitol and galactitol are used as a composition of a heat storage material which has a high temperature of phase change [Japanese Laid-Open Patent Application (Kokai) No. 32,963/1993 and Japanese Patent Announcement No. 500,946/1988 (corresponding to EP 0236382 and U.S. Pat. No. 4,795,580)].

A sugar alcohol has a large amount of heat of fusion, exhibits an excellent heat stability and is non-toxic. However, when the sugar alcohol once melt and then freeze, the supercooling what is not crystallized even at a temperature of lower than a meltiong point occurs. Japanese Laid-Open Patent Application (Kokai) No. 32,963/1993 describes that the supercooling phenomenon is alleviated by adding pentaerythritol. However, unless as large as from 10 to 30% by weight of pentaerythritol are added, no sufficient effect is obtained. Accordingly, the content of the sugar alcohol is decreased, and the amount of heat stored is reduced.

SUMMARY OF THE INVENTION

In view of the above-mentioned problems, the present inventors have assiduously conducted studies, and have consequently found that when a sparingly-soluble salt as a supercooling inhibitor is added to a specific sugar alcohol, supercooling of a heat storage material is prevented. This finding has led to the completion of the present invention. That is, the present invention is to provide a heat storage material composition comprising at least one sugar alcohol selected from erythritol, mannitol and galactitol and a sparingly-soluble salt.

Figure 1:
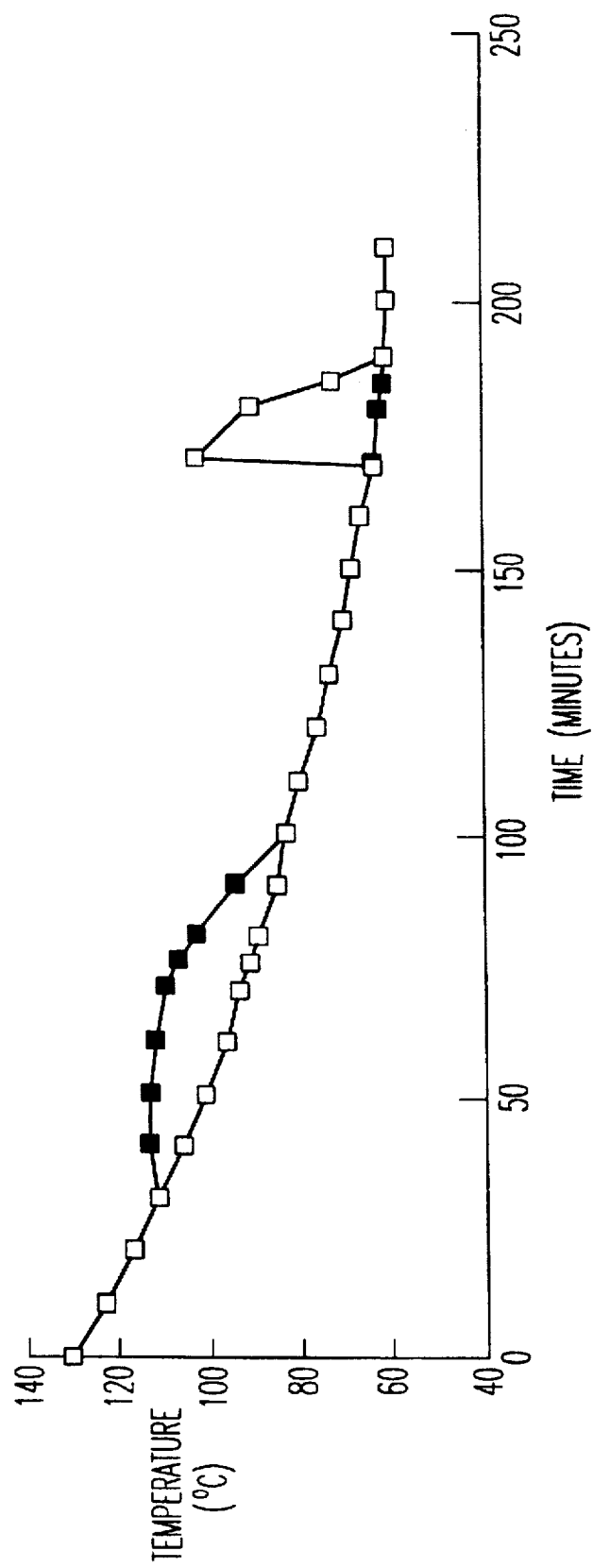
FIG. 1 is a graph showing a change in the temperature at the time of the 5th cooling in Example 5 and Comparative Example 9.

Description of symbols:

■: Example 5

☐: Comparative Example 9.

DETAILED DESCRIPTION OF THE INVENTION

The main component of the heat storage material composition in the present invention is a sugar alcohol selected from erythritol, mannitol and galactitol. These sugar alcohols may be used either singly or in combination.

The present invention is characterized in that a salt which is sparingly soluble in the sugar alcohol is added as a supercooling inhibitor to the sugar alcohol. In the present invention, the salt which is sparingly soluble in the sugar alcohol refers to an anhydrous compound which has such a solubility in water at 25° C. that the amount of the anhydrous compound contained in 100 g of a saturated solution is 20 g or less, and which is dispersed and maintained in the sugar alcohol as particles even at a use temperature of the heat storage material of from 90° to 190° C. without being decomposed or dissolved.

This supercooling inhibitor may be a salt which is sparingly soluble in water. In the present invention, the salt which is sparingly soluble in water refers to an anhydrous compound which has such a solubility in water at 25° C. that the amount of the anhydrous compound contained in 100 g of a saturated solution is 10 g or less, and which is dispersed and maintained in the sugar alcohol as particles even at a use temperature of the heat storage material of from 90° to 190° C. without being decomposed or dissolved.

The salt which is sparingly soluble in water and the salt which is sparingly soluble in a sugar alcohol (these salts are hereinafter simply referred to as "sparingly-soluble salts") include inorganic or organic salts.

Examples of the inorganic salts include phosphates, sulfates, pyrophosphates, carbonates, calcium salts of inorganic acids, aluminum salts of inorganic acids, silver salts of inorganic acids, and silver halides. Specific examples thereof include calcium tertiary phosphate $[Ca_3(PO_4)_2]$ calcium sulfate, calcium pyrophosphate $(Ca_2P_2O_7)$, calcium carbonate, calcium fluoride, aluminum phosphate, silver iodide, silver phosphate, silver bromide, and silver sulfate. Of these, calcium tertiary phosphate, calcium sulfate, aluminum phosphate, silver iodide, silver phosphate and silver bromide are preferable because the effect of inhibiting the supercooling is great and the crystallization temperature is stable even when melting and freezing are repeated.

As the organic salts, polyvalent metal salts of fatty acids having at least 16 carbon atoms, preferably from 16 to 22 carbon atoms can be mentioned. Examples thereof include palmitates, stearates and behenylates. Specific examples thereof include calcium palmitate, calcium stearate, magnesium stearate, barium stearate, and calcium behenylate.

The amount of the sparingly-soluble salt is usually between 0.01 and 30% by weight, preferably between 0.3 and 15% by weight, more preferably between 0.3 and 10% by weight based on a total amount of the sugar alcohol and the sparingly-soluble salt. When the amount of the sparingly-soluble salt is larger than 30% by weight, the amount of the sugar alcohol in the heat storage material composition is decreased to decrease the amount of heat of fusion. Meanwhile, when it is less than 0.01% by weight, the effect of preventing supercooling cannot be obtained.

The average particle diameter of the sparingly-soluble salt is usually between 0.01 and 1,000 μm. When the average particle diameter is too large, the salt is not uniformly dispersed in the heat storage material composition, making it impossible to obtain a sufficient effect of preventing supercooling.

The heat storage material composition in the present invention may be used together with known heat storage materials, for example, organic materials such as paraffins, polyethylene glycol, polyvinyl alcohol, polyethylene, crosslinked polyethylene and glycerin. Further, the composition may contain, besides the specific sugar alcohol and the sparingly-soluble salt, a thickner such as a water-insoluble super-absorbent polymer, carboxymethyl cellulose, sodium alginate, potassium alginate or fumed silica, an antioxidant such as phenols, amines or hydroxyamines, and a metal corrosion inhibitor such as chromates, polyphosphates or sodium sulfite.

The heat storage material composition in the present invention is packed into a stainless steel container 40 mm in diameter and 80 mm in height, and the container is dipped in an oil bath. The container is heated until the temperature of the sample reaches 130° C. and this sample is completely dissolved. Then, the container is allowed to cool while it is dipped in the oil bath. The temperature at which to start crystallization is measured by means of a thermocouple in a position which is 10 mm from the bottom in the center of the container. At this time, the above-mentioned temperature of the composition of the present invention is higher than that of a sugar alcohol of a blank free from the sparingly-soluble salt usually by at least 5° C., preferably by at least 10° C.

A method of preparing the heat storage material composition in the present invention is not particularly limited. The sugar alcohol, the sparingly-soluble salt and optionally the additives and the known heat storage material may be mixed and uniformly dispersed. In order to disperse them uniformly, the sugar alcohol is heated up to a temperature of higher than the melting point thereof, and is mixed with the sparingly-soluble salt and the additives while being stirred.

The heat storage material composition of the present invention may be used in the form of a capsule or a microcapsule. In the form of the capsule, the heat storage material composition is filled in the heat storage container. In the form of the microcapsule, the heat storage container is unnecessary. In the form of the capsule, the heat storage material composition is poured into the heat storage container such as a capsule, and the heat storage container is then sealed. The capsule may be formed of a material which is not deformed nor dissolved within the range of the use temperature. Examples thereof include metals such as stainless steel and aluminum, glass, and engineering plastics such as polycarbonates. The shape of the capsule is not particularly limited. Examples of the shape include a sphere, a flat plate, a pipe, a compressed cylinder, a twin sphere, and a wavy plate. It is approximately selected depending on the use. In the form of the microcapsule, fine particles of the heat storage material or an aggregate thereof is coated with a resin which is not melted nor deteriorated within the range of the use temperature. Since the surface area of the microcapsule is extremely larger than that of the capsule, a heat transfer efficiency is advantageously high.

In the heat storage system, a heating medium is passed around the capsule or the microcapsule, and the capsule or the resin by which to coat the the microcapsule acts as a heat exchanger to conduct heat storage or heat radiation. Examples of the heating medium include water, water vapor and gas such as air.

EXAMPLES

The present invention will be illustrated more specifically by referring to the following Examples. However, the present invention is not limited to these Examples.

Erythritol (made by Nikken Kagaku K.K.), sorbitol, calcium tertiary phosphate having an average particle diameter of 7.9 µm, calcium sulfate having an average particle diameter of 2.8 µm, aluminum phosphate having an average particle diameter of 15.2 µm, calcium pyrophosphate having an average particle diameter of 6.2 µg m, silver iodide having an average particle diameter of 5.0 µm (made by Kishida Kagaku K.K.), mannitol, xylose, xylitol (made by Towa Kasei Kogyo K.K.), galactitol, silver bromide having an average particle diameter of 70 µm, silver chloride having an average particle diameter of 200 µm (made by Nacalai Tesque Co.), and silver phosphate having an average particle diameter of 7.9 µm (made by Mitsuwa Kagaku Yakuhin) were used in these Examples. The average particle diameter of the sparingly-soluble salt alone was measured upon pulverizing this salt in a mortar. The average particle diameters of silver bromide and silver chloride were measured using a microscope. The average particle diameters of the other components were measured by means of a particle diameter measuring device (HORIBA LA-500, manufactured by Horiba K.K.) using distilled water (or a saturated solution of 25° C. in the case of the components which were partially dissolved in water) as a solvent.

Example 1

Erythritol (4.95 g) and 0.05 g of calcium tertiary phosphate were uniformly pulverized and mixed in a mortar.

The crystallization temperature of the resulting heat storage material composition was measured by means of a differential scanning calorimeter (DSC-220C, manufactured by Seiko Denshi Kogyo K.K.) using an aluminum sealed cell. The results are shown in Table 1.

Example 2

Example 1 was repeated except that 4.75 g of erythritol and 0.25 g of calcium tertiary phosphate were used. The crystallization temperature of the resulting heat storage material composition is shown in Table 1.

Comparative Example 1

Example 1 was repeated except that 5.00 g of erythritol alone were used. The crystallization temperature of the resulting heat storage material composition is shown in Table 1.

Examples 3 and 4

Example 2 was repeated except that erythritol was replaced with mannitol (Example 3) and galactitol (Example 4). The crystallization temperatures of the resulting products are shown in Table 1.

Comparative Examples 2 and 3

Examples 3 and 4 were repeated except that 5.00 g of mannitol (Comparative Example 2) and 5.00 g of galactitol (Comparative Example 3) alone were used. The crystallization temperatures of the resulting products are shown in Table 1.

Comparative Examples 4 to 6

Example 2 was repeated except that erythritol was replaced with sorbitol (Comparative Example 4), xylose (Comparative Example 5) and xylitol (Comparative Example 6). The crystallization temperatures of the resulting products are shown in Table 1.

Comparative Examples 7 and 8

Example 2 was repeated except that calcium phosphate was replaced with sodium chloride (Comparative Example 7) and potassium chloride (Comparative Example 8). The crystallization temperatures of the resulting products are shown in Table 1.

TABLE 1

| | Type of sugar alcohol [melting point (°C.)] | | Sparingly-soluble salt | | Crystallization temperature (°C.) |
|---|---|---|---|---|---|
| | | | Type | Amount (wt. %) | |
| Ex. 1 | erythritol | [121] | calcium tertiary phosphate | 1.0 | 61.1 |
| Ex. 2 | erythritol | [121] | calcium tertiary phosphate | 5.0 | 66.0 |
| Ex. 3 | mannitol | [169] | calcium tertiary phosphate | 5.0 | 124.3 |
| Ex. 4 | galactitol | [191] | calcium tertiary phosphate | 5.0 | 121.7 |
| CEx. 1 | erythritol | [121] | — | 0 | 53.4 |
| CEx. 2 | mannitol | [169] | — | 0 | 113.7 |
| CEx. 3 | galactitol | [191] | — | 0 | 108.5 |
| CEx. 4 | sorbitol | [98] | calcium tertiary phosphate | 5.0 | * |
| CEx. 5 | xylose | [156] | calcium tertiary phosphate | 5.0 | * |
| CEx. 6 | xylitol | [94] | calcium tertiary phosphate | 5.0 | * |
| CEx. 7 | erythritol | [121] | sodium chloride | 5.0 | 22.5 |
| CEx. 8 | erythritol | [121] | pottasium chloride | 5.0 | 22.9 |

Ex. — Example, CEx. — Comparative Example
The mark * indicates that even when the product was cooled to –70° C. by means of a differential scanning calorimeter, it was not crystallized.

Example 5

Erythritol (47.5 g) and 2.5 g of calcium tertiary phosphate were uniformly pulverized and mixed in a mortar to obtain a heat storage material composition. This composition was used as a sample, and was packed in a stainless steel container 40 mm in diameter and 80 mm in height. The container was dipped in an oil bath, and heated until the temperature of the sample reached 130° C. to completely dissolve this sample. Subsequently, the container was not withdrawn from the oil bath, and the temperature of the oil was naturally lowered. Then, the temperature at which to start crystallization of the sample was measured by means of a thermocouple. The temperature of the sample was measured in a position which was 10 mm from the bottom in the center of the container.

When the temperature of the sample reached 60° C., the sample was reheated to 130° C. in the oil bath. The heating and the cooling were repeated for a total of 100 times. The temperatures at which to start the 1st, 2nd, 5th, 10th and 100th crystallizations are shown in Table 2. Further, the change in the temperature in the 5th cooling is shown in FIG. 1.

Comparative Example 9

Example 5 was repeated except that 50 g of erythritol alone were used. The results are shown in Table 2 and FIG. 1.

From FIG. 1, it became apparent that the curves of the temperature decrease in Examples 5 and Comparative Example 9 were approximately consistent, but that the temperature at which to start crystallization in Comparative Example 9 using erythritol alone was 64° C. whereas this temperature in Example 5 using calcium phosphate was 109° C. Thus, the supercooling phenomenon was alleviated in Example 5.

Comparative Examples 10 to 12

Example 5 was repeated except that a heat storage material composition obtained by adding pentaerythritol in an amount of 10% by weight (Comparative Example 10), 20% by weight (Comparative Example 11) or 30% by weight (Comparative Example 12) to erythritol was used. The results are shown in Table 2.

TABLE 2

| | Temperature at which to start crystallization (°C.) Crystallization | | | | |
|---|---|---|---|---|---|
| | 1st | 2nd | 5th | 10th | 100th |
| Ex. 5 | 112 | 112 | 109 | 110 | 110 |
| CEx. 9 | 98 | 62 | 64 | 70 | 61 |
| CEx. 10 | 98 | — | 90 | 70 | 73 |
| CEx. 11 | 99 | — | 101 | 98 | 97 |
| CEx. 12 | 98 | — | 98 | 95 | 97 |

Ex. — Example, CEx. — Comparative Example

Examples 6 to 12

Example 1 was repeated except that erythritol was replaced with mannitol (Examples 6 to 9) and galactitol (Examples 10 to 12) and the sparingly-soluble salts were used in amounts shown in Table 3. The temperature at which to start crystallization is shown in Table 3 as a crystallization temperature.

Comparative Examples 13 to 18

Example 1 was repeated except that erythritol was replaced with sorbitol (Comparative Examples 13 to 15), xylose (Comparative Examples 16 and 17), and xylitol (Comparative Example 18), and the sparingly-soluble salts were used in amounts shown in Table 3.

TABLE 3

| | Type of sugar alcohol [melting point (°C.)] | sparingly-soluble salt | | Crystallization tempera- ture (°C.) |
|---|---|---|---|---|
| | | Type | Amount (wt. %) | |
| Ex. 6 | mannitol [169] | calcium sulfate | 5.0 | 123.8 |
| Ex. 7 | mannitol [169] | aluminum phosphate | 5.0 | 125.9 |
| Ex. 8 | mannitol [169] | calcium pyrophosphate | 5.0 | 120.9 |
| Ex. 9 | mannitol [169] | silver iodide | 0.5 | 128.9 |
| Ex. 10 | galactitol [191] | calcium sulfate | 5.0 | 117.2 |
| Ex. 11 | galactitol [191] | calcium pyrophosphate | 5.0 | 130.9 |
| Ex. 12 | galactitol [191] | silver iodide | 0.5 | 117.4 |
| CEx. 13 | sorbitol [98] | calcium sulfate | 5.0 | * |
| CEx. 14 | sorbitol [98] | aluminum phosphate | 5.0 | * |

TABLE 3-continued

| Type of sugar alcohol [melting point (°C.)] | sparingly-soluble salt | | Crystallization temperature (°C.) |
|---|---|---|---|
| | Type | Amount (wt. %) | |
| CEx. 15 sorbitol [98] | silver iodide | 0.5 | * |
| CEx. 16 xylose [156] | calcium sulfate | 5.0 | * |
| CEx. 17 xylose [156] | silver iodide | 0.5 | * |
| CEx. 18 xylitol [94] | calcium sulfate | 5.0 | * |

Ex. — Example, CEx. — Comparative Example
The mark * indicates that even when the product was cooled to −70° C. by means of a differential scanning calorimeter, it was not crystallized.

Examples 13 to 15

Example 5 was repeated except that calcium tertiary phosphate was replaced with calcium sulfate (Example 13), calcium pyrophosphate (Example 14) and aluminum phosphate (Example 15). The heating and the cooling were repeated for a total of 100 times, and the temperatures at which to start the 1st, 5th, 10th and 100th crystallizations are shown in Table 4.

Example 16

Example 5 was repeated except that 49.75 g of erythritol and 0.25 g of silver iodide were used. The heating and the cooling were repeated for a total of 100 times, and the temperatures at which to start the 1st, 5th, 10th and 100th crystallizations are shown in Table 4.

Examples 17 to 20

Example 16 was repeated except that silver iodide was replaced with silver phosphate (Example 17), silver bromide (Example 18), silver chloride (Example 19) and calcium stearate (Example 20). The heating and the cooling were repeated for a total of 100 times, and the temperatures at which to start the 1st, 5th, 10th and 100th crystallizations are shown in Table 4.

TABLE 4

| Sparingly-soluble salt | | Temperature at which to start crystallization (°C.) | | | |
|---|---|---|---|---|---|
| Type | Amount (wt. %) | 1st | 5th | 10th | 100th |
| Ex. 13 calcium sulfate | 5.0 | 112.0 | 112.0 | 112.0 | 112.0 |
| Ex. 14 calcium pyrophosphate | 5.0 | 109.5 | 107.5 | 105.5 | 107.5 |
| Ex. 15 aluminum phosphate | 5.0 | 112.0 | 109.5 | 111.0 | 111.0 |
| Ex. 16 silver iodide | 0.5 | 110.5 | 105.5 | 107.5 | 106.5 |
| Ex. 17 silver phosphate | 0.5 | 110.5 | 108.5 | 109.5 | 108.5 |
| Ex. 18 silver bromide | 0.5 | 110.0 | 110.8 | 111.0 | 111.0 |
| Ex. 19 silver chloride | 0.5 | 107.5 | 110.5 | 109.0 | 109.0 |
| Ex. 20 calcium stearate | 5.0 | 109.5 | 109.0 | 108.5 | 109.0 |

Ex. — Example

Effects of the Invention

The heat storage material composition of the present invention can stably be used for a long period of time since the crystallization temperature is not decreased even if heat storage and heat radiation are repeated.

What we claim is:

1. A heat storage material composition comprising at least one sugar alcohol selected from erythritol, mannitol and galactitol, and between 0.01 and 30% by weight of a salt having a solubility in anhydrous form of 20 g or less in 100 g of a saturated water solution at 25° C. and which is dispersed and maintained in the sugar alcohol as particles at a temperature of the heat storage material composition in a range of from 90 to 190° C. without being decomposed or dissolved.

2. The heat storage material composition of claim 1, wherein the solubility of the salt is 10 g or less in 100 g of saturated water solution at 25° C.

3. The heat storage material composition of claim 1 or 2, wherein the salt is an inorganic salt.

4. The heat storage material composition of claim 3, wherein the inorganic salt is a calcium salt or an aluminum salt of an inorganic acid.

5. The heat storage material composition of claim 3, wherein the inorganic salt is a phosphate, a sulfate or a pyrophosphate.

6. The heat storage material composition of claim 3, wherein the inorganic salt is calcium carbonate, calcium phosphate, calcium sulfate, calcium pyrophosphate, aluminum phosphate, silver phosphate, silver sulfate, silver chloride or silver iodide.

7. The heat storage material composition of claim 1 or 2, wherein the salt is an organic salt.

8. The heat storage material composition of claim 7, wherein the organic salt is a polyvalent metal salt of an aliphatic acid having at least 16 carbon atoms.

9. The heat storage material composition of claim 7, wherein the organic salt is a palmitate, a stearate or a behenylate.

10. The heat storage material composition of claim 7, wherein the organic salt is calcium palmitate, calcium stearate, magnesium stearate, barium stearate or calcium behenylate.

11. The heat storage material composition of claim 1 or 2, wherein the salt has an average particle diameter of between 0.01 and 1,000 μm.

12. The heat storage material composition of claim 1 or 2, wherein the heat storage material composition begins crystallization at a temperature that is at least 5° C. higher than said heat storage material without the salt.

* * * * *

UNITED STATES PATENT AND TRADEMARK OFFICE
CERTIFICATE OF CORRECTION

PATENT NO. : 5,785,885
DATED : July 28, 1998
INVENTOR(S) : Hiroyuki KAKIUCHI, et al.

It is certified that error appears in the above-identified patent and that said Letters Patent is hereby corrected as shown below:

On the title page, item [75], the fourth inventor's name should be:

--Tsutomu ISAKA--

Signed and Sealed this

Sixteenth Day of February, 1999

Attest:

*Acting Commissioner of Patents and Trademarks*

Attesting Officer